(12) United States Patent
Polcuch

(10) Patent No.: US 11,591,986 B2
(45) Date of Patent: Feb. 28, 2023

(54) AIRCRAFT ELECTRICALLY POWERED THRUST REVERSER SYSTEMS

(71) Applicant: Parker-Hannifin Corporation, Cleveland, OH (US)

(72) Inventor: Eric A. Polcuch, Mission Viejo, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 178 days.

(21) Appl. No.: 17/242,466

(22) Filed: Apr. 28, 2021

(65) Prior Publication Data

US 2021/0340934 A1 Nov. 4, 2021

Related U.S. Application Data

(60) Provisional application No. 63/017,920, filed on Apr. 30, 2020.

(51) Int. Cl.

| | |
|---|---|
| *F02K 1/76* | (2006.01) |
| *F16H 1/22* | (2006.01) |
| *F02C 7/32* | (2006.01) |
| *B64D 29/06* | (2006.01) |
| *F16D 59/00* | (2006.01) |
| *F16C 1/02* | (2006.01) |
| *F16H 57/02* | (2012.01) |
| *F16D 125/36* | (2012.01) |
| *F16D 121/14* | (2012.01) |

(52) U.S. Cl.
CPC .............. *F02K 1/763* (2013.01); *B64D 29/06* (2013.01); *F02C 7/32* (2013.01); *F16C 1/02* (2013.01); *F16D 59/00* (2013.01); *F16H 1/22* (2013.01); *F16H 57/02* (2013.01); *F16C 2360/23* (2013.01); *F16D 2121/14* (2013.01); *F16D 2125/36* (2013.01)

(58) Field of Classification Search
CPC . F02K 1/763; F02K 1/766; F16H 1/22; F16H 48/22; F02C 7/32
See application file for complete search history.

(56) References Cited

U.S. PATENT DOCUMENTS

| | | |
|---|---|---|
| 6,974,107 B2 | 12/2005 | Christensen et al. |
| 7,093,424 B2 | 8/2006 | Hanlon et al. |
| 7,409,820 B2 | 8/2008 | Ahrendt |

(Continued)

*Primary Examiner* — Andrew H Nguyen
(74) *Attorney, Agent, or Firm* — Renner, Otto, Boisselle & Sklar, LLP

(57) ABSTRACT

An actuation system includes a power drive unit that drives a plurality of drive shafts that each has a first end individually connected to the power drive unit. The power drive unit includes a geartrain including a plurality of individual gears that are offset relative to each other along the gearbox, and a motor-driven rotation of one of the plurality of individual gears drives rotation of the other individual gears, and each of the plurality of individual gears rotates to drive rotation of a respective one of the plurality of drive shafts. A plurality of torque brakes is mounted to the gearbox, the torque brakes being mechanically coupled to respective individual gears and drive shafts. When the torque being passed through is above a predetermined threshold value, a locking of one of the torque brakes stops rotation of all gears simultaneously to maintain positional symmetry in the actuation system.

11 Claims, 4 Drawing Sheets

(56) References Cited

U.S. PATENT DOCUMENTS

| | | | |
|---|---|---|---|
| 10,527,001 B2 | 1/2020 | Tisseau et al. | |
| 2006/0225982 A1* | 10/2006 | Baasch | B60K 17/3462 |
| | | | 191/1 R |
| 2008/0153652 A1* | 6/2008 | Nett | F16H 48/36 |
| | | | 475/207 |
| 2013/0078081 A1* | 3/2013 | Chakkera | F02K 1/763 |
| | | | 415/150 |
| 2016/0131081 A1 | 5/2016 | Maalioune et al. | |

* cited by examiner

AIRCRAFT ELECTRICALLY POWERED THRUST REVERSER SYSTEMS

FIELD OF INVENTION

The present application relates to actuation systems including a power drive unit that drives multiple actuators, such as for example in thrust reverser actuation systems (TRAS) for aircraft engines.

BACKGROUND

In recent years there has been a trend in the aerospace industry to make larger twin-aisle, twin-engine transport aircraft. These aircraft have required ever larger engines. Concurrently to improve engine efficiency, higher bypass ratio engines are being developed which have relatively larger fans. Environmental, fire hazard, and other considerations are starting to drive some airframers to switch from traditional linear hydraulic thrust reverser actuation systems (hTRAS) to electrically powered thrust reverser actuation systems (eTRAS). These larger, higher bypass ratio engines require larger more powerful thrust reverser actuation systems.

Conventional eTRAS configurations employ a power drive unit (PDU) powered by an electric motor to drive a series of flexible shafts to a multitude of actuators in a series implementation, whereby each downstream actuator is connected to the previous one in series until the last actuator is powered. This series implementation has worked well with smaller, lower powered eTRAS systems, but as the requisite power of the systems has increased, the ability to pass sufficient power through the flexible shafts in the conventional series arrangement is rapidly approaching the limit of current flex shaft design capability.

In the conventional series arrangement, the first flex shaft out of the PDU needs to transmit the power to drive up to three actuators, and with each actuator having its individual load limiter or brake, the flex shafts must also take the loads associated with the combination of PDU stall load as well as dissipating the PDU motor's kinetic energy. These added loads during a jam can be two to three times the maximum operating torque of the system, further requiring increased size and weight of the flex shafts. As the flex shaft core diameter gets larger, however, the allowable operating bend radius of the flex shaft gets larger and eventually impacts the ability to install the flex shaft in the curved nacelle envelope of the aircraft engine. Flex shafts having relatively larger core diameters also typically have lower maximum speed ratings, such that the power a flex shaft can deliver starts to flatten out at the larger core diameters. Conventional eTRAS systems, therefore, have proven deficient for more powerful thrust reverser actuation systems, such as being used in more modern larger twin-aisle, twin-engine transport aircraft.

SUMMARY OF INVENTION

The current application describes an enhanced powered thrust reverser actuation system (TRAS) that overcomes the deficiencies of conventional configurations by dedicating a single flex shaft to a single actuator such that a given flex shaft delivers only the power that a respective individual actuator requires. In other words, the conventional series arrangement of the flex shafts is replaced by a one-to-one correspondence of the flex shafts and actuators. Additionally, at the power drive unit (PDU) end of each flex shaft, a torque limiting brake or torque brake is positioned between the PDU and the flex shaft. The lock-up torque of the torque brake is set with a predetermined safety margin above the actuator's maximum operating input torque to ensure that the actuator always has sufficient torque to operate normally, but will also be locked out if the torque requirements of the actuator exceed a predetermined threshold value. This threshold value is set to protect the structural integrity of the engine structure, actuator, and flex shaft from excess torque loads. This threshold torque is typically significantly lower than the maximum jam torque required of a traditional system. When a given torque brake operation locks one of the flex shafts, by virtue of an offset spur gear interaction that drives the flex shafts, the given torque brake operation also locks all the other flex shaft outputs from the PDU, thus maintaining output position symmetry of the overall multiple actuator outputs.

The actuation system thus includes a power drive unit (PDU) equipped with multiple individual locking overload torque brakes, one dedicated to each of the one or more attached flex shafts and actuators. The actuators are connected to the PDU torque brakes via the flexible shafts. Mounting the torque brakes on the PDU allows the torque brakes to protect the flexible shafts, actuators, and other engine structures from damage in the event of a jam or torque overload. The PDU torque brakes cause the PDU offset spur gear train to stop rotating when one of the torque brakes locks, thus maintaining the symmetry of the multiple actuator outputs. The PDU also may be fitted with an energy absorbing slip-clutch between the motor and the gear train to absorb the motor's kinetic energy in the event of a sudden jam. The motor component of the PDU may be an electric motor to provide an electrically powered thrust reverser actuation system (eTRAS) implementation. By employing a one-to-one correspondence of flex shafts and actuators, with the flex shafts being driven by an offset spur gear configuration with torque brakes located at the PDU, deficiencies of conventional TRAS configurations, including conventional eTRAS configurations, are overcome.

An aspect of the invention, therefore, is an actuation system that is particularly suitable for a TRAS or eTRAS implementation for controlling an engine cowl. In exemplary embodiments, the actuation system includes a power drive unit and a plurality of drives shafts, such as flex shafts, wherein each of the plurality of drive shafts has a first end that is individually connected to the power drive unit. The power drive unit includes a gearbox that houses a geartrain including a plurality of individual gears that are offset relative to each other along the gearbox; a motor that drives rotation of a first one of the plurality of individual gears, wherein rotation of the first one of the plurality of individual gears drives rotation of the others of the plurality of individual gears, and each of the plurality of individual gears rotates to drive rotation of a respective one of the plurality of drive shafts; and a plurality of torque brakes, wherein each of the plurality of torque brakes is mounted to the gearbox and mechanically coupled to a respective one of the plurality of individual gears, and each of the plurality of torque brakes receives a respective first end of one of the plurality of drive shafts. Each of the plurality of torque brakes may be a locking type torque brake that locks when the torque being passed through is above a predetermined threshold value, whereby a locking of one of the plurality of torque brakes operates to stop rotation of all of the plurality of individual gears at a same instant to maintain positional symmetry in the actuation system.

The actuation system may be incorporated into a mechanical system by further including a plurality of mechanical actuators, wherein each of the plurality of mechanical actuators receives a respective second end of the plurality of drive shafts whereby rotation of the plurality of drive shafts drives actuation of the respective mechanical actuators. The mechanical system further may include a fixed structure to which the plurality of mechanical actuators is mounted, and a translating structure that is moveable relative to the fixed structure by operation of the plurality of mechanical actuators. The actuation system may be a TRAS or eTRAS actuation system that operates a cowl of an aircraft engine.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
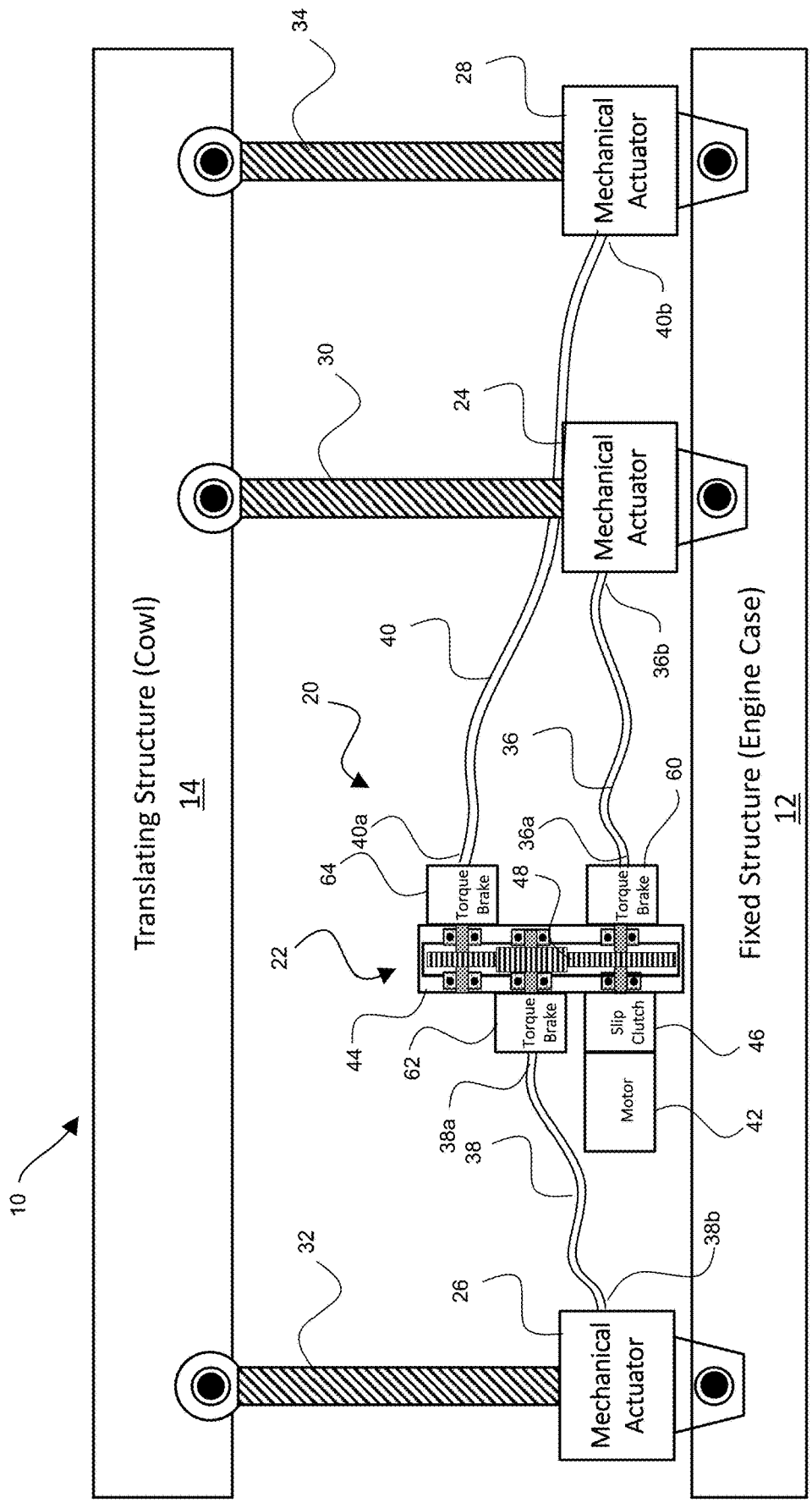
FIG. 1 is a drawing depicting an exemplary mechanical system that employs an enhanced actuation system in accordance with embodiments of the present application.

Embodiments of the present application will now be described with reference to the drawings, wherein like reference numerals are used to refer to like elements throughout. It will be understood that the figures are not necessarily to scale.

The current application describes an enhanced powered thrust reverser actuation system (TRAS) that overcomes the deficiencies of conventional configurations by dedicating a single flex shaft to a single actuator such that a given flex shaft delivers only the power that a respective individual actuator requires. In other words, the conventional series arrangement of the flex shafts is replaced by a one-to-one correspondence of the flex shafts and actuators. Additionally, at the power drive unit (PDU) end of each flex shaft, a torque limiting brake or torque brake is positioned between the PDU and the flex shaft. When a given torque brake operation locks one of the flex shafts, by virtue of an offset spur gear interaction that drives the flex shafts, the given torque brake operation also locks all the other flex shaft outputs from the PDU, thus maintaining output position symmetry of the overall multiple actuator outputs. The motor component of the PDU may be an electric motor to provide an electrically powered thrust reverser actuation system (eTRAS) implementation. By employing a one-to-one correspondence of flex shafts and actuators, with the flex shafts being driven by an offset spur geartrain configuration with torque brakes located at the PDU, deficiencies of conventional TRAS configurations, including conventional eTRAS configurations, are overcome.

FIG. 1 is a drawing depicting an exemplary mechanical system 10 that employs an enhanced actuation system 20 in accordance with embodiments of the present application. In general, the mechanical system 10 includes a fixed structure 12 and a translating structure 14 that is moveable in a translating direction relative to the fixed structure 12, i.e., moveable in a linear direction closer to or farther from the fixed structure 12. The actuation system 20 is attached to and between the fixed structure 12 and the translating structure 14, whereby in operation the actuation system 20 drives the translating structure 14 to move in such translating or linear direction relative to the fixed structure 12. For purposes of illustration and as a non-limiting example, the mechanical system 10 may be an engine nacelle half thrust reverser cowl in which the fixed structure 12 is an aircraft engine case and the translating structure 14 is the engine cowl. In such an aircraft engine example, the actuation system 20 operates as a powered thrust reverser actuation system (TRAS) to operate the cowl movement. Two such actuation systems 20 typically would be employed on each aircraft engine, inboard and outboard, with the two actuation systems either sharing a common power drive unit or each system having a dedicated power drive unit. Components of the actuator system may be made of materials commonly used in aerospace and similar industries including, for example, alloy steel, corrosion resistant steel, aluminum of different alloys, and the like, as may be suitable for any particular application.

The actuation system 20 includes a power drive unit (PDU) 22 that drives a plurality of mechanical actuators to impart motion to the translating structure 14. In other words, the translating structure 14 is moveable relative to the fixed structure 12 by operation of the plurality of mechanical actuators. The number of mechanical actuators may vary depending upon the particular application, and any suitable number of mechanical actuators may be employed. In the example of a TRAS implementation for an aircraft engine as depicted in FIG. 1, the PDU 22 drives a plurality of mechanical actuators including first, second, and third mechanical actuators 24, 26, and 28. Accordingly, an exemplary aircraft engine employs six mechanical actuators, with three mechanical actuators per cowl as illustrated in FIG. 1. The mechanical actuators 24, 26, and 28 may be any suitable linear actuator to drive respective first, second, and third linear output shafts 30, 32, and 34. In general, linear actuators operate to convert a rotational input of an input drive shaft into a linear output, and the configurations of the mechanical actuators may be implemented in any suitable manner as warranted for a particular application. For example, each of the mechanical actuators 24, 26, and 28 may be a ball nut and screw actuator as are known in the art, whereby a rotational input is converted by a ball nut and screw mechanism into a linear output of the linear output shafts 30, 32, and 34. The actuators may also be rotary type actuators converting a high speed low torque rotary input into a low speed high torque rotary output depending on application.

The PDU 22 drives the mechanical actuators 24, 26, and 28 via a respective plurality of drive shafts including first, second, and third drive shafts 36, 38, and 40. In the example of a TRAS implementation for an aircraft engine as depicted in FIG. 1, the drive shafts 36, 38, and 40 are configured as flexible drive shafts or "flex shafts" by common reference.

In various applications, drive shafts may be rigid, typically linear shafts whose shaft shape is maintained during installation and use. In contrast, flex shafts may be bent at one or more locations or otherwise re-shaped for installation. The use of flex shafts as the drive shafts 36, 38, and 40 is particularly suitable for TRAS in aircraft engine applications, as the use of flex shafts permits easy installation and implementation within the engine structure. Other suitable drive shaft configurations may be employed depending upon a particular engine design, or as warranted for other applications which may not warrant use of a flexible drive shaft.

Each of the plurality of drive shafts has a first end that is individually connected to the power drive unit, and a second end that is received in a respective one of the plurality of mechanical actuators. In operation, the PDU 22 drives rotation of the flex shafts 36, 38, and 40, and such rotation in turn is converted into a linear output by the mechanical actuators 24, 26, and 28. As seen in FIG. 1, each of the first, second, and third flex shafts 36, 38, and 40 is individually connected at a first end 36a, 38a, and 40a to the PDU, and at a second end 36b, 38b, and 40b to the respective first, second, and third mechanical actuators 24, 26, and 28. In this manner, there is a one-to-one correspondence of flex shafts and actuators, and the conventional series implementation described in the background section above is not employed in the actuation system 20 of the current application.

Figure 2:
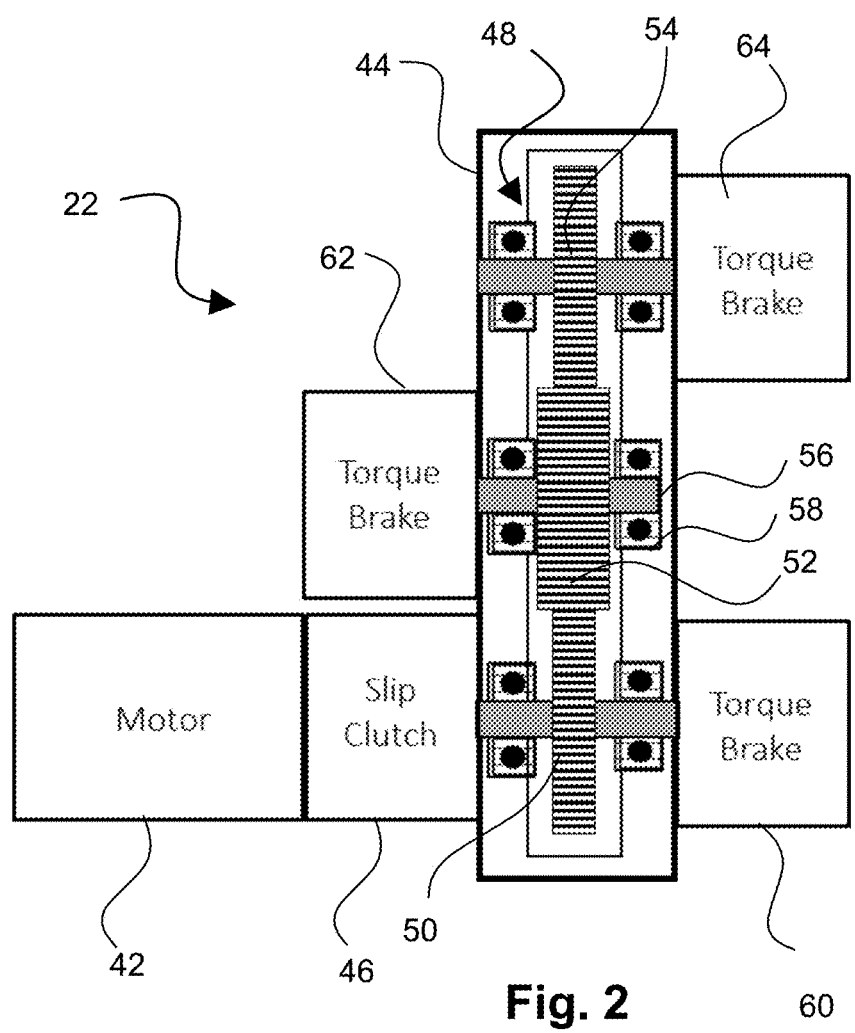
FIG. 2 is a drawing depicting the power drive unit (PDU) component of the actuation system of FIG. 1 in isolation.

FIG. 2 is a drawing depicting the PDU 22 used in the actuation system 20 of FIG. 1 in isolation. Generally, the power drive unit includes a gearbox that houses a geartrain including a plurality of individual gears that are offset relative to each other along the gearbox; a motor having that drives rotation of a first one of the plurality of individual gears, wherein rotation of the first one of the plurality of gears drives rotation of the others of the plurality of individual gears, and each of the plurality of individual gears rotates to drive rotation of a respective one of the plurality of drive shafts; and a plurality of torque brakes, wherein each of the plurality of torque brakes is mounted to the gearbox and mechanically coupled to a respective one of the plurality of individual gears, and each of the plurality of torque brakes receives a respective first end of one of the plurality of drive shafts.

Referring to FIG. 1 and FIG. 2 in combination, the PDU 22 includes a motor 42 that is mechanically coupled to an offset gearbox 44 that houses an offset geartrain 48 including a plurality of individual gears that are offset relative to each other along the gearbox. The motor 42 may be any suitable motor for a particular application, such as for example an electric, hydraulic, or pneumatic motor. In the example implementation of an electrically powered thrust reverser actuation system (eTRAS) for an aircraft engine, the motor 42 is an electric motor, such as for example an induction motor, permanent magnet synchronous motor, or a brushless or brush dc motor. A slip clutch 46 is located between the motor 42 and the gearbox 44, the operation of which is further detailed below.

The offset gearbox 44 houses the offset gear train 48, in which one individual gear is provided to correspond with each of the flex shafts. Accordingly, in the example of FIGS. 1 and 2 for aircraft engine TRAS, the gear train 48 includes a plurality of individual gears including individual first, second, and third gears 50, 52, and 54 that are rotationally coupled to the respective flex shafts 36, 38, and 40, and specifically to the PDU side shaft first ends 36a, 38a, and 40a. The individual gears may be spur gears as depicted in FIG. 2, and each of the plurality of spur gears includes a rotating gear shaft 56 that rotates within support bearings 58.

The individual gears 50, 52, and 54 are offset from each other along a length of the gearbox 44. As the gears rotate, such rotation is imparted to the flex shafts for ultimately providing the rotational inputs to the mechanical actuators. The spur gear train 48 may or may not include speed reduction or speed increaser gearing depending on the desired operating speeds of the motor and the flex shafts. In an example eTRAS implementation, the geartrain 48 has a gear ratio of 1:1 (no speed alteration gearing) as to the plurality of individual gears. The second mechanical actuator 26 is configured for reverse rotation conversion relative to the first and third mechanical actuators 24 and 28. Because of the interaction of the spur gears, the second gear 52 rotates oppositely relative to the first and third gears 50 and 54, and in turn the second flex shaft 38 rotates oppositely relative to the first and third flex shafts 36 and 40. Accordingly, the second mechanical actuator 26 imparts a reverse rotation conversion so that the linear output of all three mechanical actuators is in a common linear direction to properly drive the translating structure (cowl) 14.

The offset configuration of the PDU gearing provides clearance from the motor to allow for positioning of torque brakes for the flex shafts, and further permits shaft rotation direction reversal if needed. Each of the plurality of torque brakes is mounted to the gearbox and mechanically coupled to a respective one of the plurality of individual gears, and each of the plurality of torque brakes receives a respective first end of one of the plurality of drive shafts. In the example of FIGS. 1 and 2, a plurality of torque brakes including first, second, and third torque brakes 60, 62, and 64 is provided at the output gear shafts 56 respectively of the first, second, and third gears 50, 52, and 54. In other words, the torque brakes 60, 62, and 64 are provided at the PDU to receive the PDU-side first ends 36a, 38a, and 40a of the flex shafts. Accordingly, the torque brakes 60, 62, and 64 respectively provide braking of the first, second, and third flex shafts 36, 38, and 40. The torque brakes 60, 62, and 64 are attached to the output gear shafts of the offset spur gearing to provide torque overload protection for all of the equipment downstream of the torque brakes, such as the flex shafts, mechanical actuators, and other engine structures. Accordingly, the individual gears 50, 52, and 54 are rotationally coupled to the respective flex shafts 36, 38, and 40 via the corresponding respective torque brakes 60, 62, and 64.

Each of the plurality of torque brakes is a locking type brake such that when the torque being passed through the brake exceeds a predetermined threshold value, typically a maximum operating torque load plus a suitable margin, the torque brake locks both the input brake shaft and the output brake shaft to ground, thereby preventing any further rotation of any portion of the torque brake. More specifically, the lock-up torque of the torque brakes is set with a predetermined safety margin above the actuators' maximum operating input torque to ensure that the respective actuator always has sufficient torque to operate normally, but will also be locked out if the torque requirements of the actuator exceed a predetermined threshold. This threshold is set to protect the structural integrity of the engine structure, actuators, and flex shafts from excess torque loads. This threshold torque is typically significantly lower than the maximum jam torque required of a traditional system. The torque brakes thus do not allow for any slip between the brake input and brake output so that positional symmetry of the system is maintained.

When any one or more of the torque brakes lock, the drive gear attached to the locked brake(s) also locks, and as such all of the individual gears and torque brakes stop at the same instant maintaining positional symmetry in the actuation system. Accordingly, a locking of one of the plurality of torque brakes operates to stop rotation of all of the plurality of individual gears at a same instant to maintain positional symmetry in the actuation system. In this manner, when a given torque brake operation locks one of the flex shafts, by virtue of the offset gear interaction that drives the flex shafts, the given torque brake operation also locks all the other flex shaft outputs from the PDU, thus maintaining output position symmetry of the overall multiple actuator outputs.

In connection specifically with an eTRAS implementation, electric motors in general tend to have higher rotational speeds and relatively high mass moment of inertia, and as such the rotating rotor inertia may have a very high kinetic energy. In addition, the locking action of commonly used torque brakes is quite fast, typically being a substantially small fraction of a second. Accordingly, the torque brakes when triggered will attempt to stop the motor rotor nearly instantly. This rapid deceleration of the motor rotor can create a very high impact jam torque imparted into the spur gearing and torque brakes. Furthermore, with the fast-braking action of the torque brakes, the motor electronic controls may not have time to remove the power from the motor, further adding to this jam torque. To mitigate the effects of this high jam torque when one or more of the torque brakes are triggered, as referenced above an energy absorbing slip clutch 46 is employed between the motor 42 and the spur gearbox 44. The slip clutch 46 effectively limits the torque applied to the spur gears and torque brake inputs, thereby protecting the PDU from being damaged by the jam torque upon triggering one of the torque brakes. The slip clutch 46 dissipates the motor's electromagnetic and kinetic energy in the form of heat.

Figure 3:
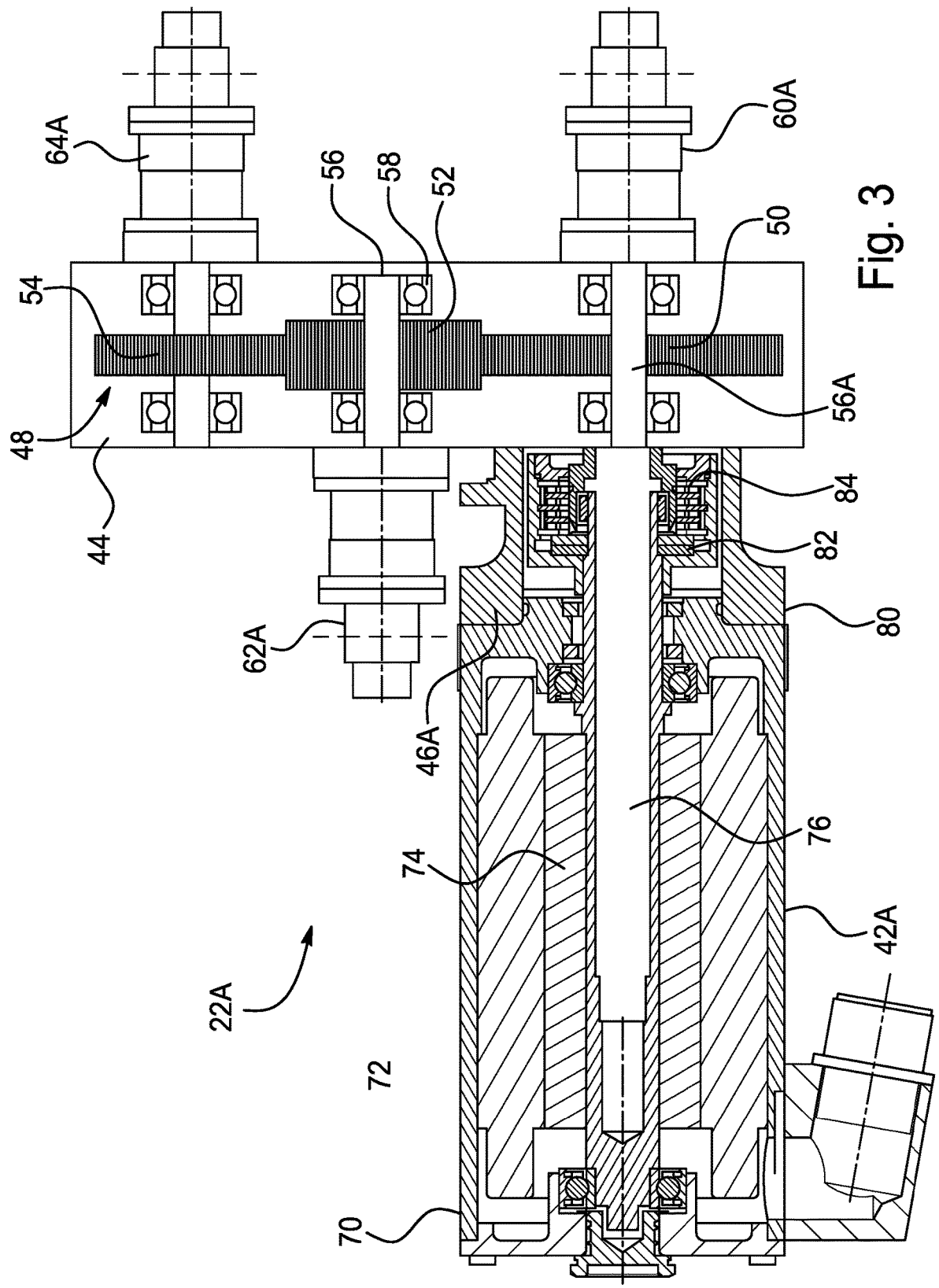
FIG. 3 is a drawing depicting an exemplary PDU in isolation, which is a variation of the PDU of FIG. 2 that illustrates additional details relating to an example implementation.
Figure 4:
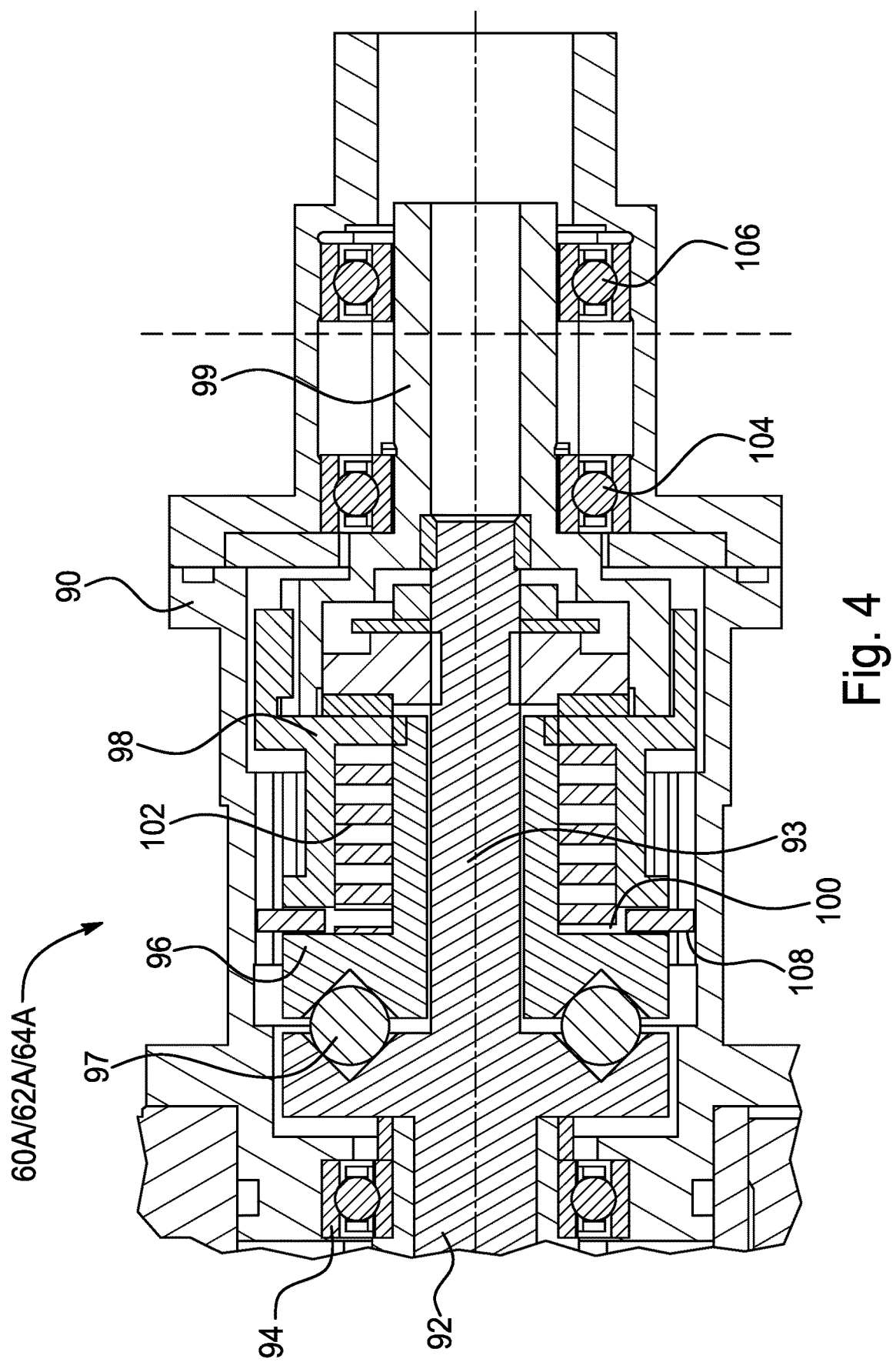
FIG. 4 is a drawing depicting an exemplary torque brake in isolation that may be used in the PDUs of FIGS. 1-3.

FIG. 3 is a drawing depicting an exemplary PDU 22A in isolation, which is a variation on the PDU 22 of FIG. 2 that illustrates additional details relating to an example implementation. Because of overlap of certain features, like reference numerals are used to refer to like components of FIGS. 2 and 3, and certain modified example components in FIG. 3 are provided an "A" designation to the reference numeral. In addition, FIG. 4 is a drawing depicting an exemplary torque brake that is depicted in the PDU of FIG. 3 in isolation. The example PDU 22A includes a motor 42A that is configured as an electric motor, and thus the PDU 22A is suitable for use in an eTRAS implementation in an aircraft engine. The electric motor 42A includes a motor housing 70 that houses an outer stator winding 72 and a rotational element 74. The rotational element 74, for example, may be an induction rotor or permanent magnet rotor depending on the motor type. When the electric motor 42A is energized, the electric motor drives rotation of a motor output shaft 76 that is mechanically coupled to a gear shaft 56A of the first spur gear 50. Rotation of the gear shaft 56A in turn drives rotation of the second and third spur gears 52 and 54 to impart rotation to the flex shafts as described above.

Comparably as described above in connection with FIGS. 1 and 2, an energy absorbing slip clutch 46A is provided between the motor 42A and the first spur gear 50. The slip clutch 46A is positioned about the motor shaft 76. Any suitable slip clutch configuration may be employed. In the depicted example of FIG. 3, the slip clutch 46A includes a clutch housing 80 that houses one or more friction disc elements 84 and one or more clutch springs 82. When the motor torque exceeds a threshold torque, such as during application of the jam torque referenced above being applied during operation of one or more of the torque brakes, the slip clutch 46A slips to dissipate the excess rotational energy as heat.

Comparably as described above in connection with FIGS. 1 and 2, the PDU 22A of FIG. 3 includes first, second, and third torque brakes 60A, 62A, and 64A. Any suitable torque brake configuration may be employed, and FIGS. 3 and 4 depict a non-limiting example configuration of the torque brakes. In the depicted example of FIGS. 3 and 4, the torque brakes are spring-loaded ball ramp and plate type brake devices. Referring more particularly to the isolated view of FIG. 4, the torque brake 60A (or 62A or 64A) includes a brake housing 90 that houses the additional brake components. Each torque brake includes an input shaft with ball ramp plate 92 that includes an input brake shaft 93 that can rotate and rests against an inner bearing assembly 94. The torque brake further includes an output ball ramp plate 96 that is located adjacent to the input plate 92. The torque brake further includes a plurality of balls 97 located in the ball pockets of the input and output ball ramp plates 92 and 96 including opposing ramped surfaces that interact against the ball element. The torque brake further includes an output adapter 98 that drives an output brake shaft 99 that receives a first end of one of the flex shafts, and a friction plate 100, the friction plate 100 being positioned between the output ball ramp plate 96 and the output adaptor 98, and being rotationally fixed in the housing 90 through a spline 108 or suitable equivalent feature. During assembly, the output adapter compresses a spring 102 to preload the input ball ramp plate 92 against the output ball ramp plate 96. As referenced above, one of the flex shafts is received within the output shaft 99 to permit rotation of the flex shaft supported by outer bearing assemblies 104 and 106.

As also referenced above, the torque brakes are locking type brakes such that when the torque being passed through the brake exceeds a predetermined threshold value, typically a maximum operating torque load plus a suitable margin, the torque brake locks both the input brake shaft and the output brake shaft to ground, thereby preventing any further rotation of any portion of the torque brake. The torque brakes thus do not allow for any slip between the brake input and output shafts so that positional symmetry of the system is maintained. In addition, referring back to FIG. 3, when any one or more of the torque brakes locks, the individual gear attached to the locked brake(s) also locks, and as such all of the gears and torque brakes stop at the same instant maintaining positional symmetry in the system. The example configuration of the torque brakes depicted in FIGS. 3 and 4 is non-limiting, and there are numerous different architectures for torque brakes which all provide the same basic function of braking rotation of the flex shafts, and any suitable torque brake configuration may be employed depending on the specific requirements or design preferences for the mechanical system.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An actuation system comprising:
a power drive unit; and
a plurality of drives shafts, wherein each of the plurality of drive shafts has a first end that is individually connected to the power drive unit;
a plurality of mechanical actuators;
wherein the power drive unit comprises:
a gearbox that houses a geartrain including a plurality of individual gears that are offset relative to each other along the gearbox;
a motor that drives rotation of a first one of the plurality of individual gears, wherein rotation of the first one of the plurality of individual gears drives rotation of the others of the plurality of individual gears, and each of the plurality of individual gears rotates to drive rotation of a respective one of the plurality of drive shafts; and
a plurality of torque brakes, wherein each of the plurality of torque brakes is mounted to the gearbox and mechanically coupled to a respective one of the plurality of individual gears, and each of the plurality of torque brakes receives the respective first end of one of the plurality of drive shafts;
wherein each of the plurality of mechanical actuators receives a respective second end of the plurality of drive shafts whereby rotation of the plurality of drive shafts drives actuation of the mechanical actuators.

2. The actuation system of claim 1, wherein each of the plurality of torque brakes is a locking type torque brake that locks when the torque being passed through is above a predetermined threshold value, whereby a locking of one of the plurality of torque brakes operates to stop rotation of all of the plurality of individual gears at a same instant to maintain positional symmetry in the actuation system.

3. The actuation system of claim 1, wherein the plurality of drive shafts are flexible drive shafts.

4. The actuation system of claim 1, wherein the motor is an electric motor.

5. The actuation system of claim 1, wherein each of the plurality of individual gears is a spur gear.

6. The actuation system of claim 1, wherein the geartrain has a gear ratio of 1:1 as to the plurality of individual gears.

7. The actuation system of claim 1, wherein the power drive unit further comprises a slip clutch employed between the motor and the gearbox, wherein when one of the plurality of torque brakes is triggered, the slip clutch operates to dissipate kinetic energy of the motor.

8. A mechanical system comprising: the actuation system of claim 1; a fixed structure to which the plurality of mechanical actuators is mounted;

and a translating structure that is moveable relative to the fixed structure by operation of the plurality of mechanical actuators.

9. The mechanical system of 8, wherein each of the mechanical actuators is a linear actuator that outputs a linear output in a common linear direction.

10. The mechanical system of claim 8, wherein the fixed structure is an engine case of an aircraft engine and the translating structure is a cowl of the aircraft engine, and the actuation system operates as a powered thrust reverser actuation system to operate cowl movement.

11. The mechanical system of claim 10, wherein the motor is an electric motor whereby the actuation system operates as an electric powered thrust reverser actuation system.

* * * * *